United States Patent
Shimamura et al.

(10) Patent No.: US 9,359,514 B2
(45) Date of Patent: Jun. 7, 2016

(54) INK JET RECORDING WATER-BASED INK AND METHOD FOR PRODUCING THE SAME

(75) Inventors: Yoshinosuke Shimamura, Kitaadachi-gun (JP); Hiroyuki Buei, Kitaadachi-gun (JP); Yukihiko Kawaharada, Kitaadachi-gun (JP); Shinichi Okada, Kitaadachi-gun (JP); Soetrisno Misawa, Jakarta (ID)

(73) Assignee: DIC CORPORATION, Tokyo (JP)

(*) Notice: Subject to any disclaimer, the term of this patent is extended or adjusted under 35 U.S.C. 154(b) by 0 days.

(21) Appl. No.: 13/996,178

(22) PCT Filed: Dec. 22, 2011

(86) PCT No.: PCT/JP2011/079890
§ 371 (c)(1),
(2), (4) Date: Sep. 6, 2013

(87) PCT Pub. No.: WO2012/086789
PCT Pub. Date: Jun. 28, 2012

(65) Prior Publication Data
US 2013/0338310 A1    Dec. 19, 2013

(30) Foreign Application Priority Data

Dec. 24, 2010 (JP) ................................. 2010-287713
Dec. 24, 2010 (JP) ................................. 2010-287714

(51) Int. Cl.
| | | |
|---|---|---|
| C08G 69/48 | (2006.01) | |
| C08G 69/14 | (2006.01) | |
| C09D 11/30 | (2014.01) | |
| C09D 11/322 | (2014.01) | |
| C09D 11/38 | (2014.01) | |
| C08G 63/685 | (2006.01) | |

(52) U.S. Cl.
CPC .............. *C09D 11/30* (2013.01); *C08G 63/685* (2013.01); *C09D 11/322* (2013.01); *C09D 11/38* (2013.01)

(58) Field of Classification Search
None
See application file for complete search history.

(56) References Cited

FOREIGN PATENT DOCUMENTS

| | | |
|---|---|---|
| JP | 57-185366 A | 11/1982 |
| JP | 01-182379 A | 7/1989 |
| JP | 01-193376 A | 8/1989 |
| JP | 05-005073 A | 1/1993 |
| JP | 2001-187851 A | 7/2001 |
| JP | 2002-179961 A | 6/2002 |
| JP | 2003-096338 A | 4/2003 |
| JP | 2008-214551 A | 9/2008 |
| JP | 2008-280430 A | 11/2008 |
| JP | 2010-126551 A | 6/2010 |

OTHER PUBLICATIONS

Full English language translation of Maeda, JP 2002-179961, Jun. 2002, pp. 1-19.*
Machine translation of Tatsuno, JP 2008-280430, Nov. 2008, pp. 1-7.*
Japanese Decision to Grant a Patent dated Feb. 12, 2013, issued in corresponding Japanese Patent Application No. 2012-528155, w/ English translation (3 pages).
International Search Report for PCT/JP2011/079890, Maling Date of Apr. 3, 2012.

* cited by examiner

*Primary Examiner* — Susannah Chung
*Assistant Examiner* — Robert T Butcher
(74) *Attorney, Agent, or Firm* — Westerman, Hattori, Daniels & Adrian, LLP

(57) ABSTRACT

Disclosed are an ink jet recording water-based ink having excellent long-term storage stability and ejection stability at a pigment concentration greater than or equal to a certain level and a simple and efficient method for producing such a water-based ink. The present invention provides an ink jet recording water-based ink in which the total content of polyvalent metals as impurities in the water-based ink is not more than 1.2 ppm in terms of 1 mass % of a pigment concentration. Furthermore, the present invention provides a method for producing an ink jet recording water-based ink; the method enables efficient production of the above-mentioned ink jet recording water-based ink through a contact treatment with a particulate chelating resin in which each resin particle contains both an alkali metal-bonded chelating group and a hydrogen-bonded chelating group.

3 Claims, No Drawings

INK JET RECORDING WATER-BASED INK AND METHOD FOR PRODUCING THE SAME

TECHNICAL FIELD

The present invention relates to an ink jet recording water-based ink exhibiting good dispersion stability and ejection stability and relates to a method for producing such a water-based ink.

BACKGROUND ART

Ink jet recording aqueous pigment inks which contain pigments dispersed in aqueous media, resins having anionic groups, and basic compounds have been traditionally proposed as ink jet recording inks which can impart good water resistance and light fastness to images recorded on recording media.

In ink jet printing, printing is carried out by ejecting ink droplets from a printer head. Examples of techniques for ejecting ink droplets include a piezoelectric technique and a thermal technique. In particular, in the thermal technique, a printer head includes a resistive heating element, such as a heater, and ink inside a nozzle is heated with the heater to eject ink droplets, which cause the rapid temperature change inside the nozzle. It is know that such a rapid temperature change leads to the occurrence of a phenomenon known as "Kogation" in which foreign substances, such as decomposed colorants and impurities, are deposited on a surface of the resistive heating element, and this phenomenon readily causes a problem in which a rate at which ink droplets are ejected is decreased in a long-term printing with the result that ink droplets eventually become unable to be ejected. Solving the problem related to Kogation has been studied even when dyes have been used as colorants; it is known that a reduction in the content of polyvalent metals as impurities in an ink is one of effective approaches (see Patent Literature 1). Even in ink jet printing which utilizes a piezoelectric technique and is free from the occurrence of Kogation, nozzle clogging is readily caused particularly due to calcium ions; hence, it is known that a reduction in the calcium ion content can improve ejection stability (see Patent Literature 2). In the techniques disclosed in Patent Literatures 1 and 2, chelating resins are used to purify dyes, thereby eliminating impurities.

An ink jet recording ink containing a dye as a colorant is disclosed, in which the dye can be preliminarily purified by salting-out to reduce the calcium content in the ink to 5 ppm (see Patent Literature 3).

In Specification, 1 ppm is equal to 1 mg/kg unless otherwise specified.

In contrast, in ink let recording inks containing pigments as colorants, it is difficult to reduce the total content of polyvalent metals, such as calcium, as impurities in the ink to 5 ppm by techniques disclosed in Patent Literatures 1 to 3 because pigments are inherently insoluble in water or organic solvents.

A technique for reducing the total content of polyvalent metals as impurities in an ink jet recording ink containing a pigment as a colorant is disclosed, in which a cation-exchange resin can be used to reduce the total content of polyvalent metals as impurities to 100 ppm or less (see Patent Literature 4). The technique disclosed in Patent Literature 4, however, is ineffective to reduce the total content of polyvalent metals as impurities to 50 ppm or less and, needless to say, impractical for reducing the total content of the polyvalent metals to 5 ppm or less. Accordingly, a technique which enables the total content of polyvalent metals as impurities in ink to be reduced to 5 ppm and which imparts excellent long-term storage stability and ejection stability to the ink has not been still developed. Hence, there has been no technique which enables the total content of polyvalent metals as impurities in a water-based ink to be reduced to 1.2 ppm or less in terms of 1 mass % of a pigment concentration.

Chelating resins are commercially available as scavengers used for polyvalent metals as impurities and have been widely used also in applications other than the techniques disclosed in Patent Literatures 1 and 2 (see Patent Literatures 5 and 6). In experiments conducted in accordance with Patent Literatures 5 and 6, an ink jet recording water-based ink having a 3% pigment concentration is treated with a commercially available chelating resin with the result that a colored precipitate is generated. The colored precipitate is adhering to the chelating resin, which prevents the resin from being regenerated through, for example, washing with acid/alkali. Such chelating resins efficiently capture target metal ions when a liquid to be treated is slightly acidic or neutral and are therefore unsuitable for efficiently and selectively capturing polyvalent metal ions under an alkaline environment at pH 8 or more. Although a variety of water-soluble chelating agents are used to remove a slight amount of metal ions, such an approach involves a complicated extraction separation process and removal process and is therefore inefficient.

In the case where a liquid to be treated is an aqueous solution which is alkaline and which contains materials insoluble in water and organic solvents, such as an ink jet recording ink containing a pigment as a colorant, it is difficult to capture polyvalent metal ions with high efficiency, and an effective techniques have been still under development.

In addition, in production of an ink recording water-based ink, a high-pressure homogenizer is used in place of a media disperser in a process for dispersing a pigment in a dispersion medium to suppress contamination of polyvalent metals as impurities derived from an apparatus used, such as impurities generated due to peeling of the inner wall of a kneader (see Patent Literature 7). Unfortunately, this approach is ineffective to prevent contamination of polyvalent metals derived from pigments, and only the limited type of apparatuses can be used with the result that optimum dispersion conditions cannot be always employed, which is problematic.

As is clear from the above-mentioned examples related to chelating resins, it is difficult to greatly decrease the total content of polyvalent metals as impurities in ink jet recording inks containing pigments as colorants while characteristics of the inks, such as long-term dispersion stability, are maintained, and development of an effective technique has been still studied. Hence, there has been a demand for a simple and efficient technique which enables a reduction in the total content of polyvalent metals in an ink jet recording water-based ink in a process for producing such a water-based ink.

Patent Literature 1: Japanese Unexamined Patent Application Publication No. 1-19376
Patent Literature 2: Japanese Unexamined Patent Application Publication No. 1-182379
Patent Literature 3: Japanese Unexamined Patent Application Publication No. 5-005073
Patent Literature 4: Japanese Unexamined Patent Application Publication No. 2002-179961
Patent Literature 5: Japanese Unexamined Patent Application Publication No. 2008-280430
Patent Literature 6: Japanese Unexamined Patent Application Publication No. 2008-214551

Patent Literature 7: Japanese Unexamined Patent Application Publication No. 2001-187851

SUMMARY OF INVENTION

Technical Problem

It is an object of the present invention to provide an ink jet recording water-based ink exhibiting excellent long-term storage stability and ejection stability at an intended pigment concentration and to provide a simple and convenient method for producing such a water-based ink.

Solution to Problem

In order to impart excellent long-term storage stability and ejection stability to an ink jet recording water-based ink containing a pigment, an anionic group-containing resin, and a basic compound at an intended pigment concentration, the total content of polyvalent metals as impurities need to be greatly reduced; the inventors have found that a contact treatment with a specific chelating resin is effectively employed as a simple and convenient method for reducing the total content of polyvalent metals and then accomplished the present invention.

A first aspect of the present invention provides an ink jet recording water-based ink containing a pigment, an anionic group-containing resin, and a basic compound, wherein the total content of polyvalent metals as impurities in the water-based ink is not more than 1.2 ppm in terms of 1 mass % of a pigment concentration.

A second aspect of the present invention provides a method for producing an ink jet recording water-based ink, the method including a contact treatment of a water-based pigment dispersion liquid with a chelating resin that is in the form of particles or fibers, the water-based pigment dispersion liquid containing a pigment, an anionic group-containing resin, and a basic compound, wherein each particle or fiber of the chelating resin contains both an alkali metal-bonded chelating group and a hydrogen-bonded chelating group, and the proportion of the alkali metal-bonded chelating group in all of the chelating groups is in the range of 30 mol % to 90 mol %.

A third aspect of the present invention provides a polyvalent metal scavenger used for an ink jet recording liquid, the polyvalent metal scavenger containing a chelating resin which contains chelating groups and which is in the form of particles or fibers, wherein each particle or fiber of the chelating resin contains both an alkali metal-bonded chelating group and a hydrogen-bonded chelating group, and the proportion of the alkali metal-bonded chelating group in all of the chelating groups in the polyvalent metal scavenger is in the range of 30 mol % to 90 mol %.

In the ink jet recording water-based ink according to an aspect of the present invention, since the total content of polyvalent metals as impurities in the water-based ink is not more than 1.2 ppm in terms of 1 mass % of a pigment concentration, Kogation which is caused by a precipitate generated on a resistive heating element of a thermal jet-type ink jet recording apparatus is less likely to occur, which leads to excellent ejection stability.

The method for producing an ink jet recording water-based ink according to an aspect of the present invention includes a contact treatment of a water-based pigment dispersion liquid with a chelating resin that is in the form of particles, the water-based pigment dispersion liquid containing a pigment, an anionic group-containing resin, and a basic compound, wherein each particle of the chelating resin contains both an alkali metal-bonded chelating group and a hydrogen-bonded chelating group, and the proportion of the alkali metal-bonded chelating group in all of the chelating groups is in the range of 30 mol % to 90 mol %.

The contact treatment of a water-based pigment dispersion liquid with a chelating resin readily enables the total content of polyvalent metals as impurities to be directly and properly reduced even when the pigment dispersion liquid has a high pigment concentration. Hence, the contact treatment with the chelating resin according to an aspect of the present invention can be carried out at any time after a pigment is dispersed in an aqueous medium, which is advantageous.

The polyvalent metal scavenger according to an aspect of the present invention enables polyvalent metals contained in a water-based ink to be easily, efficiently, and effectively removed without any effect on the physical properties of the water-based ink and, in particular, can be more advantageously used in a process for producing an ink jet recording water-based ink.

Advantageous Effects of Invention

The ink jet recording water-based ink according to an aspect of the present invention has a long-term storage stability and ejection stability greater than or equal to those of dye inks having the reduced polyvalent metal content, while excellent light fastness and water resistance inherent in pigment inks are maintained. The method for producing an ink jet recording water-based ink according to an aspect of the present invention enables more simple and efficient production of an ink jet recording water-based ink having the reduced polyvalent metal content as compared with the techniques mentioned as related art.

The polyvalent metal scavenger according to an aspect of the present invention contacts a water-based pigment dispersion liquid to readily and efficiently reduce the polyvalent metal content in the water-based pigment dispersion liquid.

DESCRIPTION OF EMBODIMENTS

Embodiments of the present invention will now be described in detail.

An ink jet recording water-based ink of the present invention is a water-based ink which contains a pigment, an anionic group-containing resin, and a basic compound, and the total content of multivalent metals as impurities in the water-based ink is not more than 1.2 ppm in terms of 1 mass % of a pigment concentration.

Polyvalent metal content in the ink jet recording water-based ink of the present invention refers to the total content of polyvalent metals regardless of their forms, such as simple polyvalent metal, a polyvalent metal ion, and a polyvalent metal component contained in a polyvalent metal-containing compound.

Polyvalent metals as impurities precipitate or sediment on, for example, an electrode of a thermal jet-type ink jet apparatus, which leads to the occurrence of Kogation. Such sedimentation on an electrode progresses with an increase in the frequency of ink ejection; hence, in order to achieve excellent ejection stability, the lower the total content of polyvalent metals as impurities, the more preferred.

Examples of polyvalent metals that are impurities to be reduced in the present invention include calcium, chromium, nickel, iron, copper, molybdenum, and strontium. These polyvalent metals as impurities may be present in a variety of forms such as simple polyvalent metal, a polyvalent metal ion, and a polyvalent metal component contained in a polyvalent metal compound; in Specification, polyvalent metals in a variety of forms are collectively referred to as "polyvalent metals as impurities" regardless of their forms for convenience of description.

Among those examples of polyvalent metals as impurities contained in a water-based pigment dispersion liquid or an ink jet recording ink, calcium content and magnesium content are generally high; in particular, the calcium content is significantly high in many cases. Hence, it is practical to analyze effects of polyvalent metals on the long-term storage stability and ejection stability of an ink jet recording water-based ink on the basis of the total content of calcium and magnesium or the calcium content. A reduction in the content of polyvalent metals as impurities can be also evaluated by measurement of the calcium content or the total content of calcium and magnesium.

Especially in the case where the polyvalent metal content in a water-based pigment dispersion liquid is decreased by a contact treatment with a chelating resin, polyvalent metal ions other than calcium ions are also captured by the resin at high selectivity greater than or equal to selectivity for calcium ions. In general, even the magnesium content is therefore actually decreased to a level substantially less than or equal to the detection limit of ICP analysis.

The total content of polyvalent metals as impurities in the ink jet recording water-based ink of the present invention is not more than 1.2 ppm in terms of 1 mass % of a pigment concentration.

In the case where a reduction in the impurities contained in the water-based pigment dispersion liquid or ink jet recording water-based ink is evaluated particularly on the basis of the calcium content, the calcium content is preferably not more than 1 ppm in terms of 1 mass % of a pigment concentration.

Furthermore, it is more preferred that the total content of calcium and magnesium as impurities in the water-based ink is not more than 1 ppm in terms of 1 mass % of a pigment concentration.

Commercially available products can be employed as the pigment used in the present invention.

Examples thereof include inorganic pigments such as carbon black; organic pigments such as azo-based pigments, phthalocyanine-based pigments, anthraquinone-based pigments, quinacridone-based pigments, metal complex-based pigments, dioxazine-based pigments, indigo-based pigments, thioindigo-based pigments, perylene-based pigments, isoindolinone-based pigments, aniline black, and azomethine-based pigments; and other organic pigments such as a Rhodamine B Lake pigment.

Commercially available products can be employed as the anionic group-containing resin used in the present invention. The anionic group-containing resin can be appropriately selected from dispersion reins having anionic groups such as a carboxyl group, a sulfonate group, a phosphate group, and salts thereof. In particular, an anionic resin having a carboxyl group or a salt thereof is preferably employed.

The anionic group-containing resin used in the present invention preferably forms a coating layer which stably coats the surface of a pigment in an aqueous medium and has a hydrophobic moiety which can be suitably adsorbed to the surface of the pigment to properly coat the surface of the pigment; in addition, the resin preferably exhibits stable water dispersibility when the anionic groups are at least partially neutralized. From this viewpoint, the acidic value of the resin is preferably in the range of 60 to 300 mgKOH/g, more preferably 80 to 250 mgKOH/g, and further preferably 100 to 200 mgKOH/g. The acid value refers to milligrams (mg) of potassium hydroxide (KOH) necessary for neutralizing 1 g of resin and is represented in units of mgKOH/g.

At an acid value less than 60 mgKOH/g, the anionic group-containing resin exhibits excessively low hydrophilicity; in such a case, the dispersion stability of a pigment tends to be decreased. At an acid value greater than 300 mgKOH/g, the hydrophilicity of the resin becomes unnecessarily increased; in such a case, the water resistance of printed articles tends to be decreased.

The weight-average molecular weight of the anionic group-containing resin used in the present invention is preferably in the range of 5,000 to 20,000, and more preferably 5,000 to 15,000.

At a weight-average molecular weight less than 5,000, although initial pigment dispersibility is excellent, the long-term storage stability of the ink tends to be decreased. At a weight-average molecular weight greater than 20,000, the viscosity of the water-based pigment dispersion liquid is increased, which is likely to decrease the ejection stability of the ink used in the form of an ink jet recording liquid, in particular, thermal jet-type ink jet recording liquid.

The glass transition point (Tg) of the anionic group-containing resin used in the present invention is preferably in the range of 50° C. to 150° C., and more preferably 70° C. to 130° C.

At a glass transition point of not less than 50° C., the water resistance of printed articles is enhanced. The thermal stability of the water-based ink is naturally also enhanced; thus, even in the case where the ink is used for thermal let-type ink let recording, the physical properties of the ink are less likely to be thermally changed, which does not lead to defective ejection. This glass transition point is therefore preferably employed.

The glass transition point of the resin used in the present invention can be calculated from resin composition.

The anionic group-containing resin to be used may be in any form, such as a homopolymer, a copolymer, a random copolymer, a block copolymer, and a graft copolymer.

Specific examples of the anionic group-containing resin include styrene-(meth)acrylate-(meth)acrylic acid resins, styrene-(meth)acrylic acid resins, styrene-styrenesulfonic acid resins, vinylnaphthalene-(meth)acrylate-(meth)acrylic acid resins, vinylnaphthalene-(meth)acrylic acid resins, (meth)acrylate-(meth)acrylic acid resins, (meth)acrylic acid resins, alkenyl ether resins, pyrrolidone resins, urethane resins, urea resins, amide resins, ester resins, carbonate resins, ether resins, epoxy resins, and alcohol resins; the anionic group-containing resin can be appropriately selected from these resins.

Among such resins, in terms of excellent dispersibility, preferred resins are styrene resins which have anionic groups derived from unsaturated aliphatic carboxylic acids having double bonds, such as acrylic acid, methacrylic acid, α-ethylacrylic acid, crotonic acid, maleic acid, and fumaric acid, and which contain styrene monomers, such as styrene, α-methylstyrene, β-methylstyrene, 2,4-dimethylstyrene, and α-ethylstyrene, as constituents of hydrophobic moieties. More preferred resins are styrene-(meth)acrylic acid resins. The term "(meth)acryl" herein refers to methacryl and/or acryl.

The styrene-(meth)acrylic acid resins contain not less than 30 mass %, preferably not less than 50 mass % of styrene monomers as constituents, which enhances the hydrophobicity of the copolymer resin and therefore enables pigments to be more strongly coated with the resin in an aqueous medium.

Hence, use of such resins is effective in developing the dispersion stability and ejection stability of the ink even in thermal jet-type ink jet recording, and such resins are therefore preferably employed.

The basic material used in the present invention serves to neutralize the anionic group-containing resin, and any existing material can be used.

Examples of usable basic materials include inorganic basic materials such as sodium hydroxide, potassium hydroxide, and ammonium; and organic basic materials such as triethylamine and alkanolamine. Among these materials, alkali metal hydroxides which have excellent thermal stability and are free from odor are preferably used, such as sodium hydroxide and potassium hydroxide; and potassium hydroxide is more preferably employed because it can exhibit stronger basicity.

The basic compound is contained in an amount which enables a rate of neutralization of the anionic group-containing resin to be normally in the range of 50 mol % to 200 mol %, and preferably 80 mol % to 120 mol %. Such a rate of neutralization is preferably employed because it can contribute to enhancing dispersibility in an aqueous medium and maintaining long-term storage stability.

The aqueous medium used in the present invention water or a mixture of water and a water-soluble organic solvent.

The aqueous medium may be merely water or contain a water-soluble organic solvent which can give the following benefits to an ink jet recording ink: for instance, prevention of drying, adjustment of viscosity, retention of humid, and adjustment of concentration.

Specific examples of the water-soluble organic solvent include glycols such as ethylene glycol, propylene glycol, diethylene glycol, triethylene glycol, polypropylene glycol, and polyoxyalkylene adducts thereof; glycerines such as glycerine and diglycerine; ethers of polyhydric alcohols, such as diethyl ether of diethylene glycol and polyoxyalkylene adducts thereof; acetates; thiodiglycol; nitrogen-containing compounds such as N-methyl-2-pyrrolidone, 1,3-dimethyl imidazolidinone, and dimethylformamide; and dimethylsulfoxide. These water-soluble organic solvents function as a humectant in some cases.

The chelating resin used in the present invention has a structure in which a chelating group is introduced into a base substance, such as a polystyrene-divinylbenzene copolymer, polyacrylonitrile, polyethylene, polymethacrylate, or a phenol resin, and is capable of capturing metal through chelation. Any resin having a functional group which enables formation of salts of alkali metals, in particular, sodium and/or potassium, can be used; a chelating resin which selectively captures polyvalent metal ions is used. Preferred examples of usable resins include iminodiacetic acid-type chelating resins and aminophosphoric acid-type chelating resins. In particular, iminodiacetic acid-type chelating resins exhibit significantly high selectivity to polyvalent metal ions and are therefore preferably employed.

Specific examples of chelating resins which can be preferably used in the present invention include iminodiacetic acid-type chelating resins such as DIAION CR11 (manufactured by Mitsubishi Chemical Corporation) and Amberlite IRC748 (manufactured by ORGANO CORPORATION).

For example, DIAION CR11 exhibits the following selectivity to metal ions: $Hg^{2+}>Cu^{2+}>Pb^{2+}>Ni^{2+}>Cd^{2+}>Zn^{2+}>Co^{2+}Fe^{2+}>Mn^{2+}>Be2+>Ca^{2+}>Mg^{2+}>Ba^{2+}>Sr^{2+}>>>Na^{+}$.
Selectivity to divalent metal ions is greatly higher than that to sodium ions. DIAION CR11 also exhibits significantly good selectivity to tri- or higher valent metal ions as follows: $Cr^{3+}>In^{3+}>Fe^{3+}>Ce^{3+}>Al^{3+}>La^{3+}>Hg^{2+}$.

An iminodiacetic acid-type chelating resin used for the contact treatment in the present invention is in the form of particles; in particular, each resin particle contains both an alkali metal-bonded chelating group and a hydrogen-bonded chelating group, and the proportion of the alkali metal-bonded chelating group in all of the chelating groups has been adjusted to be from 30 mol % to 90 mol %. Use of such a chelating resin enables easy removal of multivalent metals as impurities through a continuous process; in addition, such a chelating resin does not have adverse effects on the properties of an ink jet recording water-based ink as a final product and is therefore preferably employed.

The chelating resin used in the present invention may be in any form and is preferably in the form of particles, in particular, fine particles. The particle size of the chelating resin in the form of fine particles is preferably in the range of 100 µm to 2000 µm.

At a particle size less than 100 µm, various problems to be addressed occur due to powder dust; at a particle size greater than 2000 µm, the chelating resin has an excessively small surface area, which greatly reduces an efficiency with which polyvalent metals are captured.

The chelating resin used in the present invention is different from chelating resins used for general contact treatment in that each resin particle contains both the hydrogen-bonded chelating group and the alkali metal-bonded chelating group as described above.

In a generally recommended contact treatment with a chelating resin, a chelating resin is prepared so as to contain 100 mol % of a sodium-bonded chelating group to most efficiently remove polyvalent metals, and a liquid to be treated is adjusted so as to have a pH from 4 to 5 and then allowed to flow.

However, an ink jet recording water-based ink that is a liquid to be treated generally has a pH from 3 to 11; in the case where acid is added to the ink jet recording water-based ink to decrease the pH to a range of 4 to 5, a colorant precipitates. Hence, such an approach is impractical.

If an ink jet recording water-based ink which is a liquid to be treated and has not been subjected to pH adjustment (pH 8 to 11) is allowed to flow through a chelating resin prepared so as to contain 100 mol % of a sodium-bonded chelating group, the pH of the liquid to be treated is greatly increased. Thus, the long-term storage stability of the ink jet recording water-based ink is reduced, and the permeability of a colorant contained in the ink jet recording water-based ink to printing media is changed with the result that sharpness of formed images tends to be impaired.

In the case where an ink jet recording water-based ink which is a liquid to be treated (pH 8 to 11) is allowed to flow through a chelating resin containing 100 mol % of a hydrogen-bonded chelating group, the pH of the liquid to be treated is decreased, and the colorant contained in the ink jet recording water-based ink precipitates on or adheres to the chelating resin during the contact treatment, which causes the component variations of the water-based ink.

Even in the case where a chelating resin prepared so as to contain 100 mol % of a hydrogen-bonded chelating group is merely mixed with a chelating resin prepared so as to contain 100 mol % of an alkali metal-bonded chelating group and where the mixture is then used for contact treatment, the same problem also occurs. In such a case in which the chelating resin containing 100 mol % of a hydrogen-bonded chelating group is merely mixed with the chelating resin containing 100 mol % of an alkali metal-bonded chelating group, a liquid to be treated eventually contacts the portion of the chelating resin containing 100 mol % of a hydrogen-bonded chelating group and the portion of the chelating resin containing 100 mol % of an alkali metal-bonded chelating group in the microscopic sense. The above-mentioned problems are not accordingly overcome, and the pH variations and component variations of an ink jet recording water-based ink are unable to be suppressed.

In contrast, in the case where an ink jet recording water-based ink which is a liquid to be treated (pH 8 to 11) is allowed to flow through the chelating resin which is used in the present invention and in which each resin particle contains both a hydrogen-bonded chelating group and a alkali metal-bonded chelating group, the total content of polyvalent metals as impurities can be decreased to a desired level without any effect on the properties of the ink.

In the chelating resin which enables such a contact treatment, the proportion of the alkali-bonded chelating group in all of the chelating groups contained in the particles of the chelating resin is in the range of 30 mol % to 90 mol %. The proportion of the alkali-bonded chelating group is preferably in the range of 30 mol % to 85 mol %, more preferably 40 mol % to 80 mol %, and further preferably 50 mol % to 75 mol %.

In the chelating resin in which the proportion of an alkali metal-bonded chelating group in all of the chelating groups contained in the particles of the chelating resin is 30 mol % to 90 mol %, the ratio of the alkali metal-bonded chelating group to the hydrogen-bonded chelating group can be adjusted by repeating stirring and washing of a chelating resin; the chelating resin is stirred in an acid aqueous solution and an aqueous solution of an alkali metal hydroxide such as sodium hydroxide and potassium hydroxide, the acid aqueous solution being appropriately subjected to concentration adjustment and composed of, for example, hydrochloric acid or dilute sulfuric acid.

Alternatively, the proportion of the alkaline chelating group in all of the chelating groups contained in the chelating resin may be adjusted to a desired level in the following manner: a liquid flow column is filled with the chelating resin, and then running of an acid aqueous solution and an aqueous solution of an alkali metal hydroxide, such as sodium hydroxide and potassium hydroxide, and washing are repeated, the acid aqueous solution being subjected to concentration adjustment and composed of, for example, hydrochloric acid or dilute sulfuric acid.

In order to determine the proportion of an alkali metal-bonded chelating group in the entire chelating resin, the alkali metal content in the chelating resin is appropriately measured by existing techniques such as X-ray fluorometry, ICP spectrometry, flameless atomic absorption spectrometry, and energy dispersive X-ray spectrometry, and then the proportions of the resulting alkali metal content to alkali metal contents obtained through measurement in the cases of 100 mol % of an alkali metal-bonded chelating group and 100 mol % of a hydrogen-bonded chelating group are calculated.

In order to subject a water-based ink containing a pigment, an anionic group-containing resin, and a basic compound to a contact treatment with a particulate chelating resin in which each resin particle contains both the alkali metal-bonded chelating group and the hydrogen-bonded chelating group and in which the proportion of the alkali metal-bonded chelating group in all of the chelating groups is from 30 mol % to 90 mol %, the following techniques can be employed: in a batch technique, the chelating resin used in the present invention is directly put into a liquid to be treated and then stirred for the contact treatment; in a column technique, a column filled with the chelating resin used in the present invention is preliminarily prepared, and a liquid to be treated is allowed to flow through the column.

Different types of chelating resins can be used in combination in the present invention. For instance, in the case where an iminodiacetic acid-type chelating resin is used as a main chelating resin, another type of resin may be used in combination, such as a chelating resin containing polyamine, amidoxime, dithiocarbamic acid, thiourea, aminophosphoric acid, or glucamine. Furthermore, other ion-exchange resins, such as cation-exchange resins or anion-exchange resins, may be used in combination.

After the contact treatment with the above-mentioned chelating resin, the aqueous pigment dispersion or ink jet recording ink of the present invention can be diluted with an aqueous medium, and existing additives or other materials can be optionally added thereto. Examples of usable additives include alkaline agents, pH adjusters, surfactants, preservatives, chelating agents, plasticizers, antioxidants, ultraviolet absorbers, and ultraviolet curable resins.

A pigment concentration is preferably not less than 2 mass %, so that the ink jet recording water-based ink has proper tinting strength and that images to be formed have adequate sharpness. The upper limit of the pigment concentration varies depending on a combination of components of the ink jet recording water-based ink, such as a pigment, an anionic group-containing resin, a basic compound, and an aqueous medium; hence, it is inappropriate to determine the specific upper limit thereof.

The basic compound used in the present invention is an alkali metal hydroxide, and the alkali metal of the alkali metal hydroxide is preferably the same as the alkali metal of the alkali metal-bonded chelating group contained in the chelating resin. Alkali metal exchanged for polyvalent metals is dissolved in the ink during the contact treatment; however, in the case where the above-mentioned alkali metals are the same as each other, a variation in ink composition due to such dissolution of alkali metal is further reduced.

The ink jet recording ink of the present invention can be suitably employed as an ink used in ink jet recording apparatuses. Examples of ink jet techniques to which the ink jet recording ink can be applied include, but are not limited to, existing techniques such as continuous ejection techniques, e.g., a charge-controlling technique and spraying technique and on-demand recording techniques, e.g., a piezoelectric technique, a thermal technique, and an electrostatic absorption technique. Especially in the case where the ink jet recording ink is applied to thermal-type ink jet recording apparatuses, dispersion stability and storage stability are exhibited, and the occurrence of Kogation can be reduced for a long time, which enables highly stable ink ejection.

EXAMPLES

The present invention will now be specifically described with reference to Examples but is not limited thereto. The term "part" means "part by mass", the term "%" means "mass %", 1 L (liter) is equal to 1 dm$^3$, and 1 uL (microliter) is equal to 1 mm$^3$ unless otherwise specified.

The chelating resin used in the present invention was produced in each of Production Examples 1 to 7. The alkali metal-bonded chelating group content in the entire chelating resin was determined in the following manner.

<Calculation Example of Proportion of Potassium-Bonded Chelating Group (RK) in Entire Chelating Resin>

In accordance with the following calculation example, the proportion of the alkali metal-bonded chelating group in the entire chelating resin (RK or RN) was calculated from result of an elemental analysis (arithmetic mean at the number of test samples n=5) performed with an energy dispersive X-ray spectrometer (EDX, acceleration voltage: 15.0 kV) included in a Field Emission Scanning Electron Microscope JSM-7500FA (trade name, manufactured by JEOL Ltd.):

$$RK=SW/ST$$

SW: potassium content in a chelating resin of a test sample
ST: potassium content in a chelating resin of a standard sample having a proportion of a potassium-bonded chelating group (Rh) of 100 mol %.

In Examples, the proportion RK of the potassium-bonded chelating group in a chelating resin produced in (5) in Production Example 7 was defined as 1; the potassium content of the chelating resin was measured, which showed 5.19 mol %. For example, in the case where the potassium content in a sample was 3.94 mol %, its RK was 3.94/5.19=0.76.

[A]. Preparation of Chelating Resins

Production Examples 1 to 7

Production Example 1

Preparation of Chelating Resin RK-A (1) A chelating resin (DIAION CR11, trade name, manufactured by Mitsubishi Chemical Corporation) was immersed into water, and the solution was accurately weighed to 500 g with a graduated cylinder (tamping method) and then transferred into a beaker.
(2) The water was removed by decantation, 1 mol/L (liter) hydrochloric acid was added to the product in a volume (BV) approximately triple the volume of the chelating resin, and the mixture was stirred for approximately 10 minutes.
(3) The hydrochloric acid was removed by decantation, ion-exchanged water was added to the product at approximately 3 BV, the solution was stirred, and then the liquid content was discharged. Then, ion-exchanged water was added to the product again at approximately 3 BV, and washing was similarly carried out.
(4) Then, a 1 mol/L (liter) aqueous potassium hydroxide solution was used at approximately 3 BV to convert the chelating resin into a K-type chelating resin through the same procedure as employed in (2).
(5) Washing was carried out three times with ion-exchanged water at approximately 3 BV as in (3).
(6) Then, 150 mmol/L (liter) of hydrochloric acid was used to produce a chelating resin RK-A though the same procedure as employed in (2); in the chelating resin RK-A, each resin particle contained both a hydrogen-bonded chelating group and a potassium-bonded chelating group, and the proportion Rh of the potassium-bonded chelating group was 0.31.

Production Example 2

Preparation of Chelating Resin RK-B

A column (diameter: 60 mm*length: 990 mm) was filled with 500 g of a chelating resin (DIAION CR11, trade name, manufactured by Mitsubishi Chemical Corporation), and 1500 g of 1 mol/L (liter) hydrochloric acid was allowed to flow through the column. Then, ion-exchanged water was allowed to flow through the column to repeat water washing to adjust the pH at the outlet of the column to be not more than 3 Then, 1500 g of 1 mol/L (liter) potassium hydroxide was allowed to flow through the column, and ion-exchanged water was subsequently allowed to flow through the column to repeat water washing to adjust the pH at the outlet of the column to be not less than 10.

Then, 100 g of a 1 mol/L (liter) aqueous potassium hydroxide solution was allowed to flow through the column, and ion-exchanged water was subsequently allowed to flow through the column to repeat water washing to adjust the pH at the outlet of the column to be not more than 8. Finally, 1500 g of 50 mmol/L (liter) hydrochloric acid was allowed to flow through the column, and ion-exchanged water was subsequently allowed to flow through the column to repeat water washing to adjust the pH at the outlet of the column to be not less than 9, thereby producing a chelating resin RK-B in which each resin particle contained both a hydrogen-bonded chelating group and a potassium-bonded chelating group and in which the proportion RK of the potassium-bonded chelating group was 0.51.

Production Example 3

Preparation of Chelating Resin RK-C

Except that 100 mmol/L (liter) hydrochloric acid was used in place of 150 mmol/L (liter) hydrochloric acid in (6) in Production Example 1, a chelating resin RK-C in which the proportion RK of the potassium-bonded chelating group was 0.53 was produced as in Production Example 1.

Production Example 4

Preparation of Chelating Resin RK-D

Except that 20 mmol/L (liter) hydrochloric acid was used in place of 150 mmol/L (liter) hydrochloric acid in (6) in Production Example 1, a chelating resin RK-D in which the proportion RK of the potassium-bonded chelating group was 0.76 was produced as in Production Example 1.

Production Example 5

Preparation of Chelating Resin RN-E

Except that a 1 mol/L (liter) aqueous sodium hydroxide solution was used in place of a 1 mol/L (liter) aqueous potassium hydroxide solution in (4) in Production Example 1, a chelating resin RN-E in which each resin particle contained both a hydrogen-bonded chelating group and a sodium-bonded chelating group and in which the proportion RN of the sodium-bonded chelating group was 0.47 was produced as in Production Example 1.

Production Example 6

Preparation of Chelating Resin RK-F

Except that 200 mmol/L (liter) hydrochloric acid was used in place of 150 mmol/L (liter) hydrochloric acid in (6) in Production Example 1, a chelating resin RK-F in which the proportion RK of the potassium-bonded chelating group was 0.24 was produced as in Production Example 1.

Production Example 7

Preparation of Mixed Chelating Resin RK-X (1) A chelating resin (DIAION CR11, trade name, manufactured by Mitsubishi Chemical Corporation) was immersed into water, and the solution was accurately weighed to 250 g with a graduated cylinder (tamping method) and then transferred into a beaker.

(2) The water was removed by decantation, 1 mol/L (liter) hydrochloric acid was added to the product in a volume (BV) approximately triple the volume of the chelating resin, and the mixture was stirred for approximately 10 minutes.

(3) The hydrochloric acid was removed by decantation, ion-exchanged water was added to the product at approximately 3 BV, the solution was stirred, and then the liquid content was discharged. Then, ion-exchanged water was added to the product again at approximately 3 BV, and washing was similarly carried out.

(4) Then, a 1 mol/L (liter) aqueous potassium hydroxide solution was used at approximately 3 BV to convert the chelating resin into a K-type chelating resin through the same procedure as employed in (2).

(5) Washing was carried out three times with ion-exchanged water at approximately 3 BV as in (3), thereby producing a chelating resin in which the proportion RK of the potassium-bonded chelating group was 1.

(6) A chelating resin (DIAION CR11, trade name, manufactured by Mitsubishi Chemical Corporation) was separately immersed into water, and the solution was accurately weighed to 250 g with a graduated cylinder (tamping method) and then transferred into a beaker.

(7) The water was removed by decantation, 1 mol/L (liter) hydrochloric acid was added to the product in a volume (BV) approximately triple the volume of the chelating resin, and the mixture was stirred for approximately 10 minutes.

(8) The hydrochloric acid was removed by decantation, ion-exchanged water was added to the product at approximately 3 By, the solution was stirred, and then the liquid content was discharged. Then, ion-exchanged water was added to the product again at approximately 3 By, and washing was similarly carried out.

(9) Then, a 1 mol/L (liter) aqueous potassium hydroxide solution was used at approximately 3 By to convert the chelating resin into a K-type chelating resin through the same procedure as employed in (7).

(10) Washing was carried out three times with ion-exchanged water at approximately 3 By as in (8).

(11) Then, 1 mol/L (liter) hydrochloric acid was used to produce a chelating resin RK-G through the same procedure as employed in (7); in the chelating resin RK-G, the proportion RK of the potassium-bonded chelating group was 0.02.

(12) The chelating resin prepared in (5) so as to exhibit RK of 1 was merely mechanically mixed with all the chelating resin RK-G prepared in (11) so as to exhibit RK of 0.02, thereby producing a mixed chelating resin RK-X.

[B]. Production of Water-Based Pigment Dispersion Liquid

Production Examples 8 to 11

The following resin S and resin T were used in Examples and Comparative Examples.
Resin S: a resin having a composition ratio of monomers of styrene/methacrylic acid/acrylic acid=77/13/10 (mass ratio), a mass-average molecular weight of 12000, an acid value of 151 mgKOH/g, and
a glass transition point (calculated value) of 107° C.
Resin T: a resin having a composition ratio of monomers of styrene/methacrylic acid/acrylic acid=77/13/10 (mass ratio), a mass-average molecular weight of 7500, an acid value of 150 mgKOH/g, and
a glass transition point (calculated value) of 107° C.
The weight-average molecular weight was measured under the following conditions.
(GPC Measurement Conditions)
The mass-average molecular weights of the resins S and T were measured by GPC (gel permeation chromatography) in terms of the molecular weight of polystyrene. The measurement conditions were as follows.
Liquid delivery pump: LC-9A
System controller: SLC-6B
Automatic injector: S1L-6B
Detector: RID-6A
Manufactured by SHIMADZU CORPORATION
Data processing software: Sic480II data station (manufactured by SYSTEM INSTRUMENTS Co., Ltd.)
Column: GL-R400 (guard column)+GL-R440+GL-R450+GL-R400M (manufactured by Hitachi Chemical Co., Ltd.)
Mobile phase: THF
Flow rate: 2 ml/min
Column temperature: 35° C.

Production Example 8

Water-Based Pigment Dispersion Liquid M1

A mixture having the following Composition 1 was fed into a planetary mixer PLM-V-50V (manufactured by INOUE MFG., INC.) having a volume of 50 L, the jacket was heated, the mixture was kneaded at a low speed (rotational speed: 21 rpm, orbital speed: 14 rpm) before the temperature of the content reached 60° C., and the speed was increased (rotational speed: 35 rpm, orbital speed: 24 rpm) after the temperature of the content reached 60° C. Then, the kneading was continued.
<Composition 1>

| | |
|---|---|
| Resin S | 1500 parts |
| FASTOGEN Super Magenta RTS (manufactured by DIC Corporation) | 5000 parts |
| Diethylene glycol | 3500 parts |
| 34% aqueous potassium hydroxide solution | 662 parts |
| Ion-exchanged water | 200 parts |

The kneading was continued for an hour after maximum load current was exhibited, 200 parts of ion-exchanged water was subsequently added to this kneaded product in the kneading vessel, and then the kneading was further continued. Then, 200 parts of ion-exchanged water was further added to the product when the product was in a uniformly mixed state, and then the product was similarly kneaded into a uniformly mixed state. Then, 1000 parts of ion-exchanged water was further similarly added in total by 200 parts.

Then, the amount of ion-exchanged water to be added each time was changed to 500 parts, and, when the product was in a uniformly mixed state, 4000 parts of ion-exchanged water was added in total in the same manner as described above while the kneading was continued.

After the addition of ion-exchanged water was finished, the product was removed from the planetary mixer. To 10000 parts of this product, 4390 parts of diethylene glycol and 4433 parts of ion-exchanged water were gradually added while being stirred with a dispersion stirrer, thereby yielding a viscosity-adjusted product.

The resulting product was processed through a disperser four times (four passage) with a bead mill (Nano Mill NM-G2L manufactured by ASADA IRON WORKS. CO., LTD.) under the following conditions for being dispersed, thereby producing a pigment dispersion liquid M1 (solid concentration: 23%, pigment concentration: 17%).

<Dispersion Conditions with Bead Mill>
Disperser: Nano Mill NM-G2L (manufactured by ASADA IRON WORKS. CO., LTD.)
Bead: φ 0.3 mm zirconia bead
Bead content: 85%
Temperature of cooling water: 10° C.
Rotational speed: 2660 rpm (disc peripheral speed: 12.5 m/sec)
Liquid delivery rate: 200 g/min Production Example 9

Water-Based Pigment Dispersion Liquid Y1

A mixture having the following Composition 2 was fed into a planetary mixer PLM-V-50V (manufactured by INOUE MFG., INC.) having a volume of 50 L, the jacket was heated, the mixture was kneaded at a low speed (rotational speed: 21 rpm, orbital speed: 14 rpm) before the temperature of the content reached 60° C., and the speed was increased (rotational speed: 35 rpm, orbital speed: 24 rpm) after the temperature of the content reached 60° C. Then, the kneading was continued.

<Composition 2>

| | |
|---|---|
| Resin S | 2400 parts |
| Fast Yellow 7410 | 6000 parts |
| (Pigment Yellow 74) | |
| (manufactured by SANYO COLOR WORKS, Ltd.) | |
| 34% aqueous potassium hydroxide solution | 1118 parts |
| Diethylene glycol | 3000 parts |

Then increase in the speed caused the load current of the planetary mixer to reach the maximum load current; 30 minutes thereafter, the load current of the planetary mixer decreased and entered a stable state. In this state, the kneading was continued for three hours to produce a kneaded product.

Then, in a state in which the kneading was continued, 1000 parts of ion-exchanged water was added to the kneaded product in the kneading vessel in total by 13 parts per minute. While the kneading was continued, 4800 parts of ion-exchanged water was subsequently added to the product in total by 50 parts per minute. Then, 1500 parts of ion-exchanged water was further added, and the product was removed from the planetary mixer. Then, 3514 parts of diethylene glycol and 2185 parts of ion-exchanged water were gradually added to 10000 parts of this product while being stirred with a dispersion stirrer, thereby forming a dispersion.

The resulting product was processed through a disperser one time (one passage) with a bead mill (Nano Mill NM-G2L manufactured by ASADA IRON WORKS. CO., LTD.) under the following conditions for being dispersed, thereby producing a pigment dispersion liquid Y1 (solid concentration: 25%, pigment concentration: 16%).

<Dispersion Conditions with Bead Mill>
Disperser: Nano Mill NM-G2L (manufactured by ASADA IRON WORKS. CO., LTD.)
Bead: φ 0.3 mm zirconia bead
Bead content: 85%
Temperature of cooling water: 10° C.
Rotational speed: 2660 rpm (disc peripheral speed: 12.5 m/sec)
Liquid delivery rate: 500 g/min Production Example 10

Water-Based Pigment Dispersion Liquid C1

A mixture having the following Composition 3 was fed into a planetary mixer PLM-V-50V (manufactured by INOUE MFG., INC.) having a volume of 50 L, the jacket was heated, the mixture was kneaded at a low speed (rotational speed: 21 rpm, orbital speed: 14 rpm) before the temperature of the content reached 60° C., and the speed was increased (rotational speed: 35 rpm, orbital speed: 24 rpm) after the temperature of the content reached 60° C. Then, the kneading was continued.

<Composition 3>

| | |
|---|---|
| Resin T | 2500 parts |
| FASTOGEN Blue TGR | 5000 parts |
| (Pigment Blue 15:3) | |
| (manufactured by DIC Corporation) | |
| 34% aqueous potassium hydroxide solution | 1103 parts |
| Diethylene glycol | 2390 parts |

The increase in the speed caused the planetary mixer to exhibit the maximum load current; 15 minutes thereafter, the load current of the planetary mixer decreased and entered a stable state. In this state, the kneading was continued for three hours to produce a kneaded product. Then, 500 parts of ion-exchanged water was added to the kneaded product in the kneading vessel. The kneading was further continued, 500 parts of ion-exchanged water was further added to the product when the product was in a uniformly mixed state, and then the product was similarly kneaded into a uniformly mixed product to adjust the viscosity of the product. Then, 4000 parts of ion-exchanged water was similarly added in total by 500 parts. Then, the amount of ion-exchanged water to be added each time was changed to 1000 parts, and, when the product was in a uniformly mixed state, 4000 parts of ion-exchanged water was further added in total in the same manner as described above while the kneading was continued. After the addition of ion-exchanged water was finished, the viscosity-adjusted product was removed from the planetary mixer.

To 10000 parts of this viscosity-adjusted product, 4000 parts of diethylene glycol and 3290 parts of ion-exchanged water were gradually added while being stirred with a dispersion stirrer, thereby forming a dispersion. The product was processed through a disperser four times (four passage) with a bead mill (Nano Mill NM-G2L manufactured by ASADA IRON WORKS. CO., LTD.) under the following conditions for being dispersed, thereby producing a pigment dispersion liquid C1 (solid concentration: 24%, pigment concentration: 15%).

<Dispersion Conditions with Bead Mill>
Disperser: Nano Mill NM-G2L (manufactured by ASADA IRON WORKS. CO., LTD.)
Bead: φ 0.3 mm zirconia bead
Bead content: 85%
Temperature of cooling water: 10° C.
Rotational speed: 2660 rpm (disc peripheral speed: 12.5 m/sec)
Liquid delivery rate: 200 g/min Production Example 11

Water-Based Pigment Dispersion Liquid K

A mixture having the following Composition 4 was fed into a planetary mixer PLM-V-50V (manufactured by INOUE MFG., INC.) having a volume of 50 L, the jacket was heated, the mixture was kneaded at a low speed (rotational speed: 21 rpm, orbital speed: 14 rpm) before the temperature of the content reached 60° C., and the speed was increased (rotational speed: 35 rpm, orbital speed: 24 rpm) after the temperature of the content reached 60° C. Then, the kneading was continued.
<Composition 4>

| | |
|---|---:|
| Resin T | 1500 parts |
| TOKABLACK #5500 | 5000 parts |
| (Carbon Black) | |
| (manufactured by TOKAI CARBON CO., LTD.) | |
| Diethylene glycol | 3800 parts |
| 34% aqueous potassium hydroxide solution | 666 parts |

The increase in the speed caused the load current of the planetary mixer to reach the maximum load current; then, the kneading was continued for 30 minutes, 200 parts of ion-exchanged water was subsequently added to this kneaded product in the kneading vessel, and the kneading was further continued. Then, 200 parts of ion-exchanged water was further added to the product when the product was in a uniformly mixed state, and then the product was similarly kneaded into a uniformly mixed product. Then, the product was kneaded for approximately 2 hours while 1000 parts of ion-exchanged water was similarly added thereto in total by 200 parts.

Then, the amount of ion-exchanged water to be added each time was changed to 500 parts, and, when the product was in a uniformly mixed state, 5000 parts of ion-exchanged water was added in total in the same manner as described above while the kneading was continued.

After the addition of ion-exchanged water was finished, the kneaded product was removed from the planetary mixer. This kneaded product had a solid concentration of 38.1%. To 10000 parts of this kneaded product, 3757 parts of diethylene glycol and 2380 parts of ion-exchanged water were gradually added over 30 minutes while being stirred with a dispersion stirrer, thereby yielding a viscosity-adjusted product.

The viscosity-adjusted product was dispersed with a bead mill (Nano Mill NM-G2L manufactured by ASADA IRON WORKS. CO., LTD.) under the following conditions, thereby producing an aqueous carbon black dispersion liquid K1.
<Dispersion Conditions>
Disperser: Nano Mill NM-G2L (manufactured by ASADA IRON WORKS. CO., LTD.)
Bead: φ 0.3 mm zirconia bead
Bead content: 85%
Temperature of cooling water: 10° C.
Rotational speed: 2660 rpm (disc peripheral speed: 12.5 m/sec)
Liquid delivery rate: 200 or/min
In this case, the viscosity-adjusted product was processed through a disperser four times (four passage) under the above-mentioned conditions for being dispersed.
The aqueous carbon black dispersion liquid K1 had a solid concentration of 25% and a carbon black concentration of 18%.

Examples which will now be described as representative examples of a contact treatment with a chelating resin includes two cases each involving use of four colors (magenta, cyan, yellow, and black). In one case, a liquid in which a pigment was merely dispersed in an aqueous medium, namely, a water-based pigment dispersion liquid, was used as a liquid to be treated. Such a water-based pigment dispersion liquid also corresponded to an ink jet recording water-based ink having a high pigment concentration before dilution and addition of additives.

In the other case, an ink jet recording water-based ink prepared from the above-described water-based pigment dispersion liquid was used as a liquid to be treated. Except that such an ink jet recording water-based ink had the large total content of polyvalent metals as impurities, this ink jet recording water-based ink had composition equivalent to that of a commercially available final product of the ink jet recording water-based ink.

[C]. Examples Involving Use of Aqueous Pigment Dispersion as Liquid to Be Treated Examples 1 to 20, Comparative Examples 1 to 13

Into columns each having a diameter of 50 mm and a length of 500 mm, 70 g of the chelating resins (e.g., RK-A) prepared in Production Examples 1 to 7 were separately put. The aqueous pigment dispersions (M1, Y1, C1, and K1) prepared in Production Examples 8 to 11, respectively, were allowed to flow through the columns at SV=10 or SV=30 to yield treated aqueous pigment dispersions (M2A to M2H, Y2A, and so on). The statuses, Ca contents, and other properties of the contact-treated aqueous pigment dispersions (M2A to M2H, Y2A, and so on) were analyzed. The term "SV" used herein refers to space velocity and is represented as the inverse of time over which a raw liquid contacts a filter layer per hour. In the present invention, it is a relative amount of ink to be treated per unit time to the volume of a chelating resin; in particular, 1 SV is equivalent to the mass (gram) of ink to be treated with a gram of resin per hour. The contact treatments with the chelating resins were analyzed by the following method in terms of the items described below. Table 1 shows results of the analysis.
(Precipitate on Chelating Resin)
The presence or absence of precipitate was visually observed, and Examples in which precipitate had not been observed were evaluated as "Absence", and other Examples in which precipitate had been observed were evaluated as "Presence".
(Ca Content)
A sample was accurately weighted to approximately 0.2 g and decomposed (2 cm$^3$ of nitric acid for precise analysis was added as a decomposing agent) with a microwave sample preparation apparatus (MLS-1200MEGA, manufactured by Milestone General K.K.). Ultra-ion-exchanged water was added to the resulting decomposed liquid, the solution was then filtered, a measuring flask was then used to determine the volume of the resulting filtrate to be 25 cm$^3$, and this solution was analyzed with an ICP analyzer (Optima 3300DV, manufactured by PerkinElmer Inc.) to determine the Ca content.
(pH Measurement)
The pH of each of the treated water-based pigment dispersion liquids and ink jet recording water-based inks was measured at 25° C. with a Castany LAB pH meter F-22 (manufactured by HORIBA, Ltd.).

TABLE 1

| Items | Flowing samples | Prepared chelating resins | Alkali metal | Proportion of alkali metal-bonded chelating group (mol %) | Treated dispersion liquid No. | Precipitation | Ca content (ppm) SV = 10 | Ca content (ppm) SV = 30 | pH |
|---|---|---|---|---|---|---|---|---|---|
| Example 1 | M1 (pigment concentration 17%) | RK-A | K | 31 | M2A | Absence | 13 | 15 | 10.1 |
| Example 2 | | RK-B | K | 51 | M2B | Absence | 14 | 16 | 10.3 |
| Example 3 | | RK-C | K | 53 | M2C | Absence | 14 | 16 | 10.4 |
| Example 4 | | RK-D | K | 76 | M2D | Absence | 15 | 17 | 10.6 |
| Example 5 | | RN-E | Na | 47 | M2E | Absence | 14 | 15 | 10.2 |
| Comparative Example 1 | | None* | — | — | M2 | — | 35 | — | 9.9 |
| Comparative Example 2 | | RK-F | K | 24 | M2F | Presence | — | — | — |
| Comparative Example 3 | | RK-G | (H) | 0 | M2G | Presence | — | — | — |
| Comparative Example 4 | | RK-X | K | 50 (Mixed) | M2X | Presence | — | — | — |
| Example 6 | Y1 (pigment concentration 16%) | RK-A | K | 31 | Y2A | Absence | 7 | 8 | 10.1 |
| Example 7 | | RK-B | K | 51 | Y2B | Absence | 8 | 9 | 10.2 |
| Example 8 | | RK-C | K | 53 | Y2C | Absence | 8 | 9 | 10.3 |
| Example 9 | | RK-D | K | 76 | Y2D | Absence | 8 | 9 | 10.6 |
| Example 10 | | RN-E | Na | 47 | Y2E | Absence | 8 | 10 | 10.2 |
| Comparative Example 5 | | None* | — | — | Y2 | — | 25 | — | 9.9 |
| Comparative Example 6 | | RK-F | K | 24 | Y2F | Presence | — | — | — |
| Comparative Example 7 | | RK-G | (H) | 0 | Y2G | Presence | — | — | — |
| Example 11 | C1 (pigment concentration 15%) | RK-A | K | 31 | C2A | Absence | 11 | 12 | 10.1 |
| Example 12 | | RK-B | K | 51 | C2B | Absence | 10 | 11 | 10.2 |
| Example 13 | | RK-C | K | 53 | C2C | Absence | 10 | 11 | 10.3 |
| Example 14 | | RK-D | K | 76 | C2D | Absence | 11 | 12 | 10.6 |
| Example 15 | | RN-E | Na | 47 | C2E | Absence | 12 | 13 | 10.1 |
| Comparative Example 8 | | None* | — | — | C2 | — | 30 | — | 9.9 |
| Comparative Example 9 | | RK-G | (H) | 0 | C2G | Presence | — | — | — |
| Comparative Example 10 | | RK-X | K | 50 (Mixed) | C2X | Presence | — | — | — |
| Example 16 | K1 (pigment concentration 15%) | RK-A | K | 31 | K2A | Absence | 5 | 6 | 10.0 |
| Example 17 | | RK-B | K | 51 | K2B | Absence | 4 | 5 | 10.1 |
| Example 18 | | RK-C | K | 53 | K2C | Absence | 4 | 5 | 10.2 |
| Example 19 | | RK-D | K | 76 | K2D | Absence | 5 | 6 | 10.5 |
| Example 20 | | RN-E | Na | 47 | K2E | Absence | 6 | 7 | 10.0 |
| Comparative Example 11 | | None* | — | — | K2 | — | 25 | — | 9.9 |
| Comparative Example 12 | | RK-G | (H) | 0 | K2G | Presence | — | — | — |
| Comparative Example 13 | | RK-X | K | 50 (Mixed) | K2H | Presence | — | — | — |

*"None" means that the contact treatment with a chelating resin was not carried out.

[D]. Production of Ink Jet Recording Water-based ink as Liquid to Be Treated (Before Contact Treatment Production Examples 12 to 15

The water-based pigment dispersion liquids (M1, Y1, C1, and K1) of Production Examples 8 to 11 were used to prepare ink jet recording water-based ink (M5, Y5, C5, and K5) (before contact treatment) as shown in Table 2, respectively.

TABLE 2

| Items | Ink No. | Dispersion liquids No. | Amount (part) | Diethylene glycol (part) | SANNIX GP-600 (part) | Glycerine (part) | Ion-exchanged water (part) | Pigment concentration (%) |
|---|---|---|---|---|---|---|---|---|
| Production Example 12 | M5 | M1 | 23.5 | 5.0 | 5.0 | 3.0 | 66.5 | 4.0 |
| Production Example 13 | Y5 | Y1 | 23.1 | 5.0 | 5.0 | 3.0 | 66.9 | 4.0 |
| Production Example 14 | C5 | C1 | 19.7 | 5.0 | 5.0 | — | 70.3 | 3.0 |
| Production Example 15 | K5 | K1 | 19.7 | 5.0 | 5.0 | — | 70.3 | 3.0 |

[E]. Examples Involving Use of Ink Jet Recording Water-Based Ink as Liquid to be Treated Examples 21 to 40, Comparative Examples 14 to 26

Into columns each having a diameter of 50 mm and a length of 500 mm, 70 g of the chelating resins prepared in Production Examples 1 to 7 were separately put. The aqueous pigment inks (M5, Y5, C5, and K5) prepared in Production Examples 12 to 15, respectively, were allowed to flow through the columns at SV=10 or SV=30 to yield treated aqueous pigment inks (M6A to M6G, Y6A, and so on). The statuses, Ca contents, and other properties of the treated aqueous pigment inks (M6A to M6H, Y6A, and so on) were analyzed, and Table 3 shows results of the analysis. Table 4 shows the Ca content of each treated aqueous pigment ink and the Ca content in terms of 1 mass % of a pigment concentration.

TABLE 3

| Items | Flowing samples | Prepared chelating resins | Alkali metal | Proportion of alkali metal-bonded chelating group (mol %) | Treated dispersion liquid No. | Resin precipitation | Ca content (ppm) SV = 10 | Ca content (ppm) SV = 30 | pH |
|---|---|---|---|---|---|---|---|---|---|
| Example 21 | M5 (pigment concentration 4%) | RK-A | K | 31 | M6A | Absence | 2.9 | 3.2 | 9.9 |
| Example 22 | | RK-B | K | 51 | M6B | Absence | 2.7 | 3.0 | 10.1 |
| Example 23 | | RK-C | K | 53 | M6C | Absence | 2.7 | 3.0 | 10.2 |
| Example 24 | | RK-D | K | 76 | M6D | Absence | 2.8 | 3.1 | 10.4 |
| Example 25 | | RN-E | Na | 47 | M6E | Absence | 3.0 | 3.2 | 10.0 |
| Comparative Example 14 | | None | — | — | M6 | — | 8.4 | | 9.7 |
| Comparative Example 15 | | RK-F | K | 24 | (M6F) | Presence | — | — | — |
| Comparative Example 16 | | RK-G | (H) | 0 | M6G | Presence | — | — | — |
| Comparative Example 17 | | RK-X | K | 50 (Mixed) | (M6X) | Presence | — | — | — |
| Example 26 | Y5 (pigment concentration 4%) | RK-A | K | 31 | Y6A | Absence | 1.2 | 1.4 | 9.9 |
| Example 27 | | RK-B | K | 51 | Y6B | Absence | 1.3 | 1.4 | 10.1 |
| Example 28 | | RK-C | K | 53 | Y6C | Absence | 1.3 | 1.4 | 10.2 |
| Example 29 | | RK-D | K | 76 | Y6D | Absence | 1.4 | 1.5 | 10.4 |
| Example 30 | | RN-E | Na | 47 | Y6E | Absence | 1.6 | 1.7 | 10.0 |
| Comparative Example 18 | | None | — | — | Y6 | — | 6.4 | | 9.7 |
| Comparative Example 19 | | RK-F | K | 24 | (Y6F) | Presence | — | — | — |
| Comparative Example 20 | | RK-G | (H) | 0 | Y6G | Presence | — | — | — |
| Example 31 | C5 (pigment concentration 3%) | RK-A | K | 31 | C6A | Absence | 1.9 | 2.0 | 9.8 |
| Example 32 | | RK-B | K | 51 | C6B | Absence | 1.8 | 2.1 | 9.9 |
| Example 33 | | RK-C | K | 53 | C6C | Absence | 1.8 | 2.0 | 10.0 |
| Example 34 | | RK-D | K | 76 | C6D | Absence | 1.9 | 2.1 | 10.3 |
| Example 35 | | RN-E | Na | 47 | C6E | Absence | 2.0 | 2.2 | 9.9 |
| Comparative Example 21 | | None | — | — | C6 | — | 6.2 | | 9.6 |
| Comparative Example 22 | | RK-G | (H) | 0 | Y6G | Presence | — | — | — |
| Comparative Example 23 | | RK-X | K | 50 (Mixed) | (C6X) | Presence | — | — | — |
| Example 36 | K5 (pigment concentration 3%) | RK-A | K | 31 | K6A | Absence | 0.9 | 1.0 | 9.7 |
| Example 37 | | RK-B | K | 51 | K6B | Absence | 0.9 | 1.0 | 9.9 |
| Example 38 | | RK-C | K | 53 | K6C | Absence | 0.9 | 1.0 | 9.9 |
| Example 39 | | RK-D | K | 76 | K6D | Absence | 1.0 | 1.1 | 10.2 |
| Example 40 | | RN-E | Na | 47 | K6E | Absence | 1.2 | 1.3 | 9.8 |
| Comparative Example 24 | | None | — | — | K6 | — | 5.1 | | 9.6 |
| Comparative Example 25 | | RK-G | (H) | 0 | K6G | Presence | — | — | — |
| Comparative Example 26 | | RK-X | K | 50 (Mixed) | (K6X) | Presence | — | — | — |

TABLE 4

| Items | Flowing samples | Ca content (ppm) SV = 10 | Ca content (ppm) SV = 30 | Ca content in terms of 1 mass % of pigment concentration (ppm) SV = 10 | Ca content in terms of 1 mass % of pigment concentration (ppm) SV = 30 |
|---|---|---|---|---|---|
| Example 21 | M5 (pigment concentration 4%) | 2.9 | 3.2 | 0.73 | 0.80 |
| Example 22 | | 2.7 | 3.0 | 0.68 | 0.75 |
| Example 23 | | 2.7 | 3.0 | 0.68 | 0.75 |
| Example 24 | | 2.8 | 3.1 | 0.70 | 0.78 |
| Example 25 | | 3.0 | 3.2 | 0.75 | 0.80 |
| Comparative Example 14 | | 8.4 | | 2.10 | |
| Comparative Example 15 | | — | — | — | — |
| Comparative Example 16 | | — | — | — | — |
| Comparative Example 17 | | — | — | — | — |
| Example 26 | Y5 (pigment concentration 4%) | 1.2 | 1.4 | 0.30 | 0.35 |
| Example 27 | | 1.3 | 1.4 | 0.33 | 0.35 |
| Example 28 | | 1.3 | 1.4 | 0.33 | 0.35 |
| Example 29 | | 1.4 | 1.5 | 0.35 | 0.38 |
| Example 30 | | 1.6 | 1.7 | 0.40 | 0.43 |

TABLE 4-continued

| Items | Flowing samples | Ca content (ppm) SV = 10 | Ca content (ppm) SV = 30 | Ca content in terms of 1 mass % of pigment concentration (ppm) SV = 10 | Ca content in terms of 1 mass % of pigment concentration (ppm) SV = 30 |
|---|---|---|---|---|---|
| Comparative Example 18 | | 6.4 | | 1.60 | |
| Comparative Example 19 | | — | — | — | — |
| Comparative Example 20 | | — | — | — | — |
| Example 31 | C5 (pigment concentration 3%) | 1.9 | 2.0 | 0.63 | 0.67 |
| Example 32 | | 1.8 | 2.1 | 0.60 | 0.70 |
| Example 33 | | 1.8 | 2.0 | 0.60 | 0.67 |
| Example 34 | | 1.9 | 2.1 | 0.63 | 0.70 |
| Example 35 | | 2.0 | 2.2 | 0.67 | 0.73 |
| Comparative Example 21 | | 6.2 | | 2.07 | |
| Comparative Example 22 | | — | — | — | — |
| Comparative Example 23 | | — | — | — | — |
| Example 36 | K5 (pigment concentration 3%) | 0.9 | 1.0 | 0.30 | 0.33 |
| Example 37 | | 0.9 | 1.0 | 0.30 | 0.33 |
| Example 38 | | 0.9 | 1.0 | 0.30 | 0.33 |
| Example 39 | | 1.0 | 1.1 | 0.33 | 0.37 |
| Example 40 | | 1.2 | 1.3 | 0.40 | 0.43 |
| Comparative Example 24 | | 5.1 | | 1.70 | |
| Comparative Example 25 | | — | — | — | — |
| Comparative Example 26 | | — | — | — | — |

[F]. Preparation of Ink Jet Recording Ink from Treated Aqueous Pigment Dispersion Production Examples 16 to 39

The aqueous pigment dispersions (M2A to K2G) prepared in Examples 1 to 20 were used as shown in Table 5 to prepare treated color ink compositions (M3A to K3G). The Ca contents of the color ink compositions were analyzed, and Table 6 shows results of the analysis. In addition, Table 6 shows the Ca content in terms of 1 mass, of a pigment concentration.

TABLE 5

| Items | Ink No. | Dispersion liquids No. | Dispersion liquids Amount (part) | DEG (part) | SANNIX GP-600 (part) | Glycerine (part) | Pure water (part) | Pigment concentration (%) |
|---|---|---|---|---|---|---|---|---|
| Production Example 16 | M3A | M2A | 23.5 | 5.0 | 5.0 | 3.0 | Balance | 4.0 |
| Production Example 17 | M3B | M2B | | | | | | 4.0 |
| Production Example 18 | M3C | M2C | | | | | | 4.0 |
| Production Example 19 | M3D | M2D | | | | | | 4.0 |
| Production Example 20 | M3E | M2E | | | | | | 4.0 |
| Production Example 21 | M3G | M2 | | | | | | 4.0 |
| Production Example 22 | Y3A | Y2A | 23.1 | 5.0 | 5.0 | 3.0 | Balance | 4.0 |
| Production Example 23 | Y3B | Y2B | | | | | | 4.0 |
| Production Example 24 | Y3C | Y2C | | | | | | 4.0 |
| Production Example 25 | Y3D | Y2D | | | | | | 4.0 |
| Production Example 26 | Y3E | Y2E | | | | | | 4.0 |
| Production Example 27 | Y3G | Y2 | | | | | | 4.0 |
| Production Example 28 | C3A | C2A | 19.7 | 5.0 | 5.0 | — | Balance | 3.0 |
| Production Example 29 | C3B | C2B | | | | | | 3.0 |
| Production Example 30 | C3C | C2C | | | | | | 3.0 |
| Production Example 31 | C3D | C2D | | | | | | 3.0 |
| Production Example 32 | C3E | C2E | | | | | | 3.0 |
| Production Example 33 | C3G | C2 | | | | | | 3.0 |
| Production Example 34 | K3A | K2A | 19.7 | 5.0 | 5.0 | — | Balance | 3.0 |
| Production Example 35 | K3B | K2B | | | | | | 3.0 |
| Production Example 36 | K3C | K2C | | | | | | 3.0 |
| Production Example 37 | K3D | K2D | | | | | | 3.0 |
| Production Example 38 | K3E | K2E | | | | | | 3.0 |
| Production Example 39 | K3G | K2 | | | | | | 3.0 |

* SANNIX GP-600 (trade name, manufactured by Sanyo Chemical Industries, Ltd.)

TABLE 6

| Items | Ink No. | Ca content (ppm) SV = 10 | Ca content (ppm) SV = 30 | Ca content in terms of 1 mass % of pigment concentration (ppm) SV = 10 | Ca content in terms of 1 mass % of pigment concentration (ppm) SV = 30 |
|---|---|---|---|---|---|
| Production Example 16 | M3A | 3.1 | 3.5 | 0.78 | 0.88 |
| Production Example 17 | M3B | 3.3 | 3.8 | 0.83 | 0.95 |
| Production Example 18 | M3C | 3.3 | 3.8 | 0.83 | 0.95 |
| Production Example 19 | M3D | 3.5 | 3.9 | 0.88 | 0.98 |
| Production Example 20 | M3E | 3.3 | 3.5 | 0.83 | 0.88 |
| Production Example 21 | M3G | 8.2 | | 2.05 | |
| Production Example 22 | Y3A | 1.6 | 1.8 | 0.40 | 0.45 |
| Production Example 23 | Y3B | 1.8 | 2.1 | 0.45 | 0.53 |
| Production Example 24 | Y3C | 1.8 | 2.1 | 0.45 | 0.53 |
| Production Example 25 | Y3D | 1.8 | 2.1 | 0.45 | 0.53 |
| Production Example 26 | Y3E | 1.8 | 2.3 | 0.45 | 0.58 |
| Production Example 27 | Y3G | 5.8 | | 1.45 | |
| Production Example 28 | C3A | 2.2 | 2.4 | 0.73 | 0.80 |
| Production Example 29 | C3B | 2.0 | 2.2 | 0.67 | 0.73 |
| Production Example 30 | C3C | 2.0 | 2.2 | 0.67 | 0.73 |
| Production Example 31 | C3D | 2.1 | 2.4 | 0.70 | 0.80 |
| Production Example 32 | C3E | 2.4 | 2.6 | 0.80 | 0.87 |
| Production Example 33 | C3G | 5.9 | | 1.97 | |
| Production Example 34 | K3A | 1.0 | 1.2 | 0.33 | 0.40 |
| Production Example 35 | K3B | 0.8 | 1.0 | 0.27 | 0.33 |
| Production Example 36 | K3C | 0.8 | 1.0 | 0.27 | 0.33 |
| Production Example 37 | K3D | 1.0 | 1.2 | 0.33 | 0.40 |
| Production Example 38 | K3E | 1.2 | 1.4 | 0.40 | 0.47 |
| Production Example 39 | K3G | 4.9 | | 1.63 | |

[G]. Evaluation of Physical Properties of Contact-treated Ink Jet Recording Water-Based Ink Examples 41 to 70, Comparative Examples 27 to 32

The ink jet recording inks (M6A to K6E) prepared through the contact treatments with the chelating resins in Examples 21 to 40 and the ink jet recording inks (M3A to K3G) prepared from the treated aqueous pigment dispersions (M2A to K2G) were subjected to analysis of ink physical properties, and Tables 7 to 10 show results of evaluation of the ink physical properties. The following evaluation items and methods were employed.

All of the inks used for the evaluation in Examples had been treated at SV=10.

(Average Particle Size)

A Nanotrac particle size distribution analyzer UPA-EX150 (manufactured by NIKKISO CO., LTD.) was used to measure a volume-average particle size by a dynamic light scattering method. The following measurement conditions were employed: 10 $cm^3$ of ion-exchanged water was added to 10 μL (microliter) of a water-based ink to prepare a diluted solution used for the measurement, and the measurement was carried out at 25° C.

(Viscosity)

A VISCOMETER TV-22 (manufactured by TOKI SANYO CO. LTD) was used to analyze the water-based inks at 25° C.

(Temporal Stability)

The inks produced as described above were stored in a thermostatic chamber at 60° C. for 35 days, and then the average particle size and viscosity thereof were measured and evaluated.

—Evaluation Criteria—

Good (satisfied) . . . variation less than 10 nm in a particle size and variation less than 10% in viscosity Bad (rejected) . . . variation not less than 10 nm in particle size and/or variation not less than 10% in viscosity.

(Ejection Stability)

Test inks were placed at the position of a black cartridge in an ink jet printer Photosmart D5360 (manufactured by Hewlett-Packard Company), and qualification of each ink for ink jet recording was evaluated; in particular, printing was successively carried out on five sheets of A4 paper within the 80% area thereof at 100% image density, and then ink ejection properties before and after the printing were evaluated.

—Evaluation Criteria—

Good (satisfied) . . . no defective ejection was observed, and formed images had good quality.

Bad (rejected) . . . after the successive printing, the direction of ink ejection was abnormal, or uneven print density was observed.

TABLE 7

| Items | Test inks | Particle size T/nm | Viscosity η/mPa·s | Temporal stability | Ejection stability |
|---|---|---|---|---|---|
| Example 41 | M3A | 147 | 3.9 | Good (satisfied) | Good (satisfied) |
| Example 42 | M3B | 133 | 3.8 | Good (satisfied) | Good (satisfied) |
| Example 43 | M3C | 140 | 3.3 | Good (satisfied) | Good (satisfied) |
| Example 44 | M3D | 115 | 3.4 | Good (satisfied) | Good (satisfied) |
| Example 45 | M3E | 124 | 3.2 | Good (satisfied) | Good (satisfied) |
| Comparative Example 27 | M3G | 136 | 3.5 | Good (satisfied) | Bad (rejected) |
| Example 46 | M6A | 112 | 3.6 | Good (satisfied) | Good (satisfied) |
| Example 47 | M6B | 157 | 3.6 | Good (satisfied) | Good (satisfied) |
| Example 48 | M6C | 121 | 3.0 | Good (satisfied) | Good (satisfied) |
| Example 49 | M6D | 117 | 3.7 | Good (satisfied) | Good (satisfied) |
| Example 50 | M6E | 106 | 3.7 | Good (satisfied) | Good (satisfied) |
| Comparative Example 28 | M6 | 117 | 3.2 | Good (satisfied) | Bad (rejected) |

TABLE 8

| Items | Test inks | Particle size T/nm | Viscosity η/mPa·s | Temporal stability | Ejection stability |
|---|---|---|---|---|---|
| Example 51 | Y3A | 102 | 3.3 | Good (satisfied) | Good (satisfied) |
| Example 52 | Y3B | 110 | 3.5 | Good (satisfied) | Good (satisfied) |
| Example 53 | Y3C | 127 | 3.4 | Good (satisfied) | Good (satisfied) |
| Example 54 | Y3D | 122 | 4.0 | Good (satisfied) | Good (satisfied) |
| Example 55 | Y3E | 146 | 3.6 | Good (satisfied) | Good (satisfied) |
| Comparative Example 29 | Y3G | 110 | 3.7 | Good (satisfied) | Bad (rejected) |
| Example 56 | Y6A | 136 | 3.4 | Good (satisfied) | Good (satisfied) |
| Example 57 | Y6B | 113 | 3.9 | Good (satisfied) | Good (satisfied) |
| Example 58 | Y6C | 123 | 3.1 | Good (satisfied) | Good (satisfied) |
| Example 59 | Y6D | 165 | 3.3 | Good (satisfied) | Good (satisfied) |
| Example 60 | Y6E | 107 | 3.5 | Good (satisfied) | Good (satisfied) |
| Comparative Example 30 | Y6 | 118 | 3.7 | Good (satisfied) | Bad (rejected) |

TABLE 9

| Items | Test inks | Particle size T/nm | Viscosity η/mPa·s | Temporal stability | Ejection stability |
|---|---|---|---|---|---|
| Example 61 | C3A | 102 | 3.7 | Good (satisfied) | Good (satisfied) |
| Example 62 | C3B | 121 | 3.4 | Good (satisfied) | Good (satisfied) |
| Example 63 | C3C | 103 | 3.8 | Good (satisfied) | Good (satisfied) |
| Example 64 | C3D | 106 | 3.4 | Good (satisfied) | Good (satisfied) |
| Example 65 | C3E | 159 | 3.8 | Good (satisfied) | Good (satisfied) |
| Comparative Example 31 | C3G | 158 | 3.9 | Good (satisfied) | Bad (rejected) |
| Example 66 | C6A | 121 | 3.4 | Good (satisfied) | Good (satisfied) |
| Example 67 | C6B | 109 | 3.8 | Good (satisfied) | Good (satisfied) |
| Example 68 | C6C | 103 | 3.5 | Good (satisfied) | Good (satisfied) |
| Example 69 | C6D | 110 | 3.1 | Good (satisfied) | Good (satisfied) |
| Example 70 | C6E | 108 | 3.0 | Good (satisfied) | Good (satisfied) |
| Comparative Example 32 | C6 | 156 | 4.0 | Good (satisfied) | Bad (rejected) |

TABLE 10

| Items | Test inks | Particle size T/nm | Viscosity η/mPa·s | Temporal stability | Ejection stability |
|---|---|---|---|---|---|
| Example 71 | K3A | 102 | 3.7 | Good (satisfied) | Good (satisfied) |
| Example 72 | K3B | 101 | 3.4 | Good (satisfied) | Good (satisfied) |
| Example 73 | K3C | 103 | 3.8 | Good (satisfied) | Good (satisfied) |
| Example 74 | K3D | 106 | 3.4 | Good (satisfied) | Good (satisfied) |
| Example 75 | K3E | 109 | 3.8 | Good (satisfied) | Good (satisfied) |
| Comparative Example 33 | K3G | 106 | 3.9 | Good (satisfied) | Bad (rejected) |
| Example 76 | K6A | 103 | 3.4 | Good (satisfied) | Good (satisfied) |
| Example 77 | K6B | 109 | 3.8 | Good (satisfied) | Good (satisfied) |
| Example 78 | K6C | 103 | 3.5 | Good (satisfied) | Good (satisfied) |
| Example 79 | K6D | 102 | 3.1 | Good (satisfied) | Good (satisfied) |
| Example 80 | K6E | 108 | 3.0 | Good (satisfied) | Good (satisfied) |
| Comparative Example 34 | K6 | 106 | 4.0 | Good (satisfied) | Bad (rejected) |

[H]. Measurement of Free Ca Content

It is presumed that the contact treatment with a chelating resin in the present invention mainly affects polyvalent metals existing in the aqueous media of a water-based pigment dispersion liquid and ink jet recording water-based ink. In order to confirm a reduction in the polyvalent metal content in the aqueous media of an aqueous pigment dispersion and ink jet recording ink, the following experiment was carried out.

Example 81

The dispersion M2C prepared in Example 3 was subjected to ultracentrifugation under the following conditions, and the supernatant liquid of the resulting dispersion was collected. The Ca content of the supernatant liquid was measured by an ICP analysis.
Ultracentrifugal separator: Optima TLX (manufactured by Beckman Coulter, Inc.)
Rotational speed: 110,000 rpm
Operation time: 3 hours
Operation temperature: 25° C.

Examples 82 to 84, Comparative Examples 35 to 38

The Ca content of the supernatant liquid of the aqueous pigment dispersion prepared in each of Examples 8, 13, and 18 and Comparative Examples 1, 5, 8, and 11 was measured as in Example 81. Table 11 shows results of the measurement.

TABLE 11

| | | Material Ca content (ppm) | | | |
|---|---|---|---|---|---|
| | | Before ultracentrifugation | | Supernatant liquid after ultracentrifugation | |
| Test sample No. | | SV = 10 | SV = 30 | SV = 10 | SV = 30 |
| Example 81 | M2C | 14 | 16 | 2 | 3 |
| Comparative example 35 | M1 | 35 | | 17 | |
| Example 82 | Y2C | 8 | 9 | 2 | 3 |
| Comparative example 36 | Y1 | 25 | | 14 | |
| Example 83 | C2C | 10 | 11 | 2 | 3 |
| Comparative example 37 | C1 | 30 | | 14 | |
| Example 84 | K2C | 4 | 5 | 1 | 2 |
| Comparative example 38 | K1 | 13 | | 6 | |

The Mg (magnesium) content was less than detection limit (0.02 ppm) of the measurement.

Examples 85 to 88, Comparative Examples 39 to 42

The Ca content of the supernatant liquid of the ink jet recording water-based ink prepared in each of Production Examples 18, 21, 24, 27, 30, 33, 36, and 39 was measured as in Example 81. Table 12 shows results of the measurement.

TABLE 12

| | | Material Ca content (ppm) | | | |
|---|---|---|---|---|---|
| | | Before ultracentrifugation | | Supernatant liquid after ultracentrifugation | |
| Test sample No. | | SV = 10 | SV = 30 | SV = 10 | SV = 30 |
| Example 85 | M3C | 3.3 | 3.8 | 0.5 | 0.7 |
| Comparative example 39 | M3G | | 8.2 | | 3.9 |
| Example 86 | Y3C | 1.8 | 2.1 | 0.4 | 0.5 |
| Comparative example 40 | Y3G | | 5.8 | | 1.4 |
| Example 87 | C3C | 2.0 | 2.2 | 0.4 | 0.5 |
| Comparative example 41 | C3G | | 5.9 | | 1.2 |
| Example 88 | K3C | 0.8 | 1.0 | 0.2 | 0.3 |
| Comparative example 42 | K3G | | 4.9 | | 1.0 |

As is clear from Examples and Comparative Examples, the ink jet recording water-based ink according to the present invention, in particular, a water-based ink which contained a pigment, an anionic group-containing resin, and a basic compound and in which the total content of polyvalent metals as impurities in the water-based ink was not more than 1.2 ppm in terms of 1 mass % of a pigment concentration had excellent temporal stability and ejection stability. In the case where a water-based pigment dispersion liquid or an ink jet recording water-based ink contained polyvalent metals as impurities in the total amount larger than the above-mentioned total content, such a water-based pigment dispersion liquid or ink jet recording water-based ink was subjected to the contact treatment with a specific chelating resin having alkali metal-bonded chelating group, thereby readily producing an ink jet recording water-based ink having the total content of multivalent metals of not more than 1.2 ppm.

The effect of a reduction in the total content of multivalent metals as impurities was provided under the following conditions: the chelating resin was in the form of particles, each resin particle contained both an alkali metal-bonded chelating group and a hydrogen-bonded chelating group, and the proportion of the alkali metal-bonded chelating group in the entire chelating resin was in the range of 30 mol % to 90 mol %.

The contact treatment involving use of such a chelating resin as a polyvalent metal scavenger significantly contributed to a reduction in the polyvalent metal content in an aqueous medium.

In other words, a chelating resin in which the proportion of the alkali metal-bonded chelating group in the entire chelating resin was in the range of 30 mol % to 90 mol % was used as a polyvalent metal scavenger, so that the total content of polyvalent metals as impurities was able to be decreased to a desired level without a compositional variation of ink, the compositional variation having an adverse effect on the physical properties of an ink jet recording water-based ink.

The above-mentioned ink jet recording water-based ink in which the total content of polyvalent metals as impurities had been reduced to a desired level had excellent temporal stability and ejection stability as described above.

INDUSTRIAL APPLICABILITY

The ink jet recording water-based ink of the present invention can be desirably used as an ink let recording water-based ink having excellent long-term storage stability and ejection stability. Owing to the method of the present invention for producing an ink jet recording water-based ink, in which a polyvalent metal scavenger is used, the ink jet recording water-based ink having a significantly low polyvalent metal content can be produced in a very simple manner.

The invention claimed is:

1. A method for producing an ink jet recording aqueous ink, the method comprising:
   a contact treatment of an aqueous liquid with an iminodiacetic acid-type chelating resin, the aqueous liquid to be treated having a pH value of 8 to 11,
   wherein the iminodiacetic acid-type chelating resin is in the form of particles or fibers,
   wherein the aqueous liquid contains a pigment, an anionic group-containing resin, and a basic compound,
   wherein each particle or fiber of the iminodiacetic acid-type chelating resin contains chelating groups, which include a potassium-bonded chelating group and a hydrogen-bonded chelating group, and
   wherein the iminodiacetic acid-type chelating resin used in the contact treatment consists of a proportion of the potassium-bonded chelating group in all of the chelating groups in the range of 30 mol % to 90 mol %,
   wherein a total content of polyvalent metals as impurities in the ink jet recording aqueous ink is not more than 1.2 ppm in terms of 1 mass % of a pigment concentration.

2. A polyvalent metal scavenger used for an ink jet recording liquid, the polyvalent metal scavenger comprising a chelating resin which contains a potassium-bonded chelating group and which is in the form of particles or fibers, wherein the chelating resin is an iminodiacetic acid-type chelating resin,
   each particle or fiber of the chelating resin contains chelating groups, which include the potassium-bonded chelating group and a hydrogen-bonded chelating group, and
   wherein the iminodiacetic acid-type chelating resin consist of a proportion of the potassium-bonded chelating group in all of the chelating groups in the range of 30 mol % to 90 mol %,
   wherein the polyvalent metal scavenger is used to treat an aqueous liquid at a pH value of 8 to 11.

3. The polyvalent metal scavenger to claim 2, wherein a total content of polyvalent metals as impurities in the ink jet recording aqueous ink is not more than 1.2 ppm in terms of 1 mass % of a pigment concentration.

* * * * *